(12) United States Patent
Jaenker

(10) Patent No.: US 7,717,373 B2
(45) Date of Patent: May 18, 2010

(54) DEFORMABLE AERODYNAMIC PROFILE

(75) Inventor: Peter Jaenker, Riemerling (DE)

(73) Assignee: EADS Deutschland GmbH, Ottobrunn (DE)

(*) Notice: Subject to any disclaimer, the term of this patent is extended or adjusted under 35 U.S.C. 154(b) by 908 days.

(21) Appl. No.: 10/544,226

(22) PCT Filed: Feb. 3, 2004

(86) PCT No.: PCT/DE2004/000162

§ 371 (c)(1),
(2), (4) Date: Feb. 8, 2006

(87) PCT Pub. No.: WO2004/069651

PCT Pub. Date: Aug. 19, 2004

(65) Prior Publication Data

US 2006/0214065 A1    Sep. 28, 2006

(30) Foreign Application Priority Data

Feb. 4, 2003    (DE) .................. 103 04 530

(51) Int. Cl.
B64C 3/54    (2006.01)

(52) U.S. Cl. ......................................... 244/218

(58) Field of Classification Search ......... 244/218–219, 244/46
See application file for complete search history.

(56) References Cited

U.S. PATENT DOCUMENTS

| | | | | |
|---|---|---|---|---|
| 3,076,903 A * | 2/1963 | Schwartz | ...................... | 310/330 |
| 5,473,214 A | 12/1995 | Hildebrand | | |
| 5,869,189 A * | 2/1999 | Hagood et al. | ............... | 428/461 |
| 6,025,975 A * | 2/2000 | Fard et al. | ................. | 360/294.4 |
| 6,043,587 A * | 3/2000 | Jaenker | ...................... | 310/328 |
| 6,045,096 A * | 4/2000 | Rinn et al. | ................... | 244/219 |
| 6,048,622 A | 4/2000 | Hagood, IV et al. | | |
| 6,076,776 A | 6/2000 | Breitbach et al. | | |
| 6,152,405 A | 11/2000 | Muller | | |
| 6,375,127 B1 * | 4/2002 | Appa | .......................... | 244/215 |
| 2004/0070311 A1 | 4/2004 | Bebesel et al. | | |

FOREIGN PATENT DOCUMENTS

| | | |
|---|---|---|
| DE | 196 43 222 C2 | 4/1998 |
| DE | 197 09 917 C1 | 4/1998 |
| DE | 197 12 034 A1 | 9/1998 |
| DE | 197 45 468 C1 | 4/1999 |

(Continued)

OTHER PUBLICATIONS

PCT International Search Report dated Jul. 7, 2004 w/ English translation of relevant portion (Eight (8) pages).

(Continued)

*Primary Examiner*—Tien Dinh
(74) *Attorney, Agent, or Firm*—Crowell & Moring, LLP

(57) ABSTRACT

A deformable aerodynamic profiled member has a front profile area and a rear profile area in the outflow area. It is bounded by shells on the pressure side and/or on the suction side, converging in a rear profile edge (6). D33 piezo actuators are provided in at least some locations for deformation of the profiled member. The piezo actuators are aligned such that their length changes essentially in the direction of the planes of the shells when acted upon by electricity.

11 Claims, 2 Drawing Sheets

FOREIGN PATENT DOCUMENTS

| | | |
|---|---|---|
| DE | 694 22 916 T2 | 10/2000 |
| DE | 100 54 643 A1 | 5/2002 |
| DE | 101 39 686 A1 | 5/2002 |
| DE | 100 60 018 A1 | 6/2002 |
| EP | 1 235 284 A2 | 8/2002 |
| WO | WO 02/31378 A1 | 4/2002 |

OTHER PUBLICATIONS

PCT/ISA/237 W/ English Translation (Ten (10) pages).

* cited by examiner

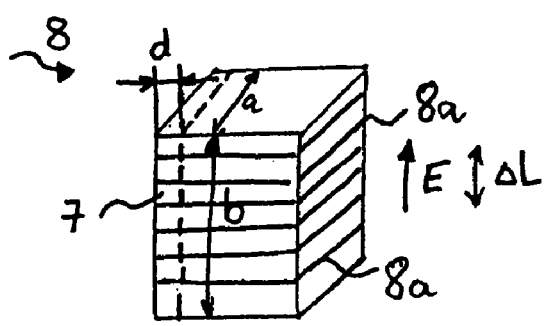
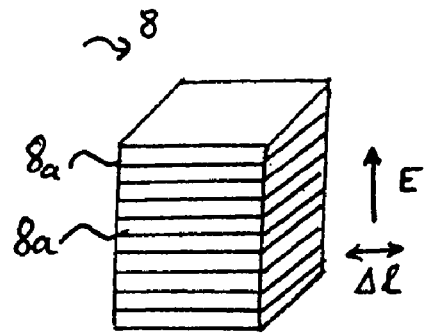
Fig. 2a                Fig. 2b
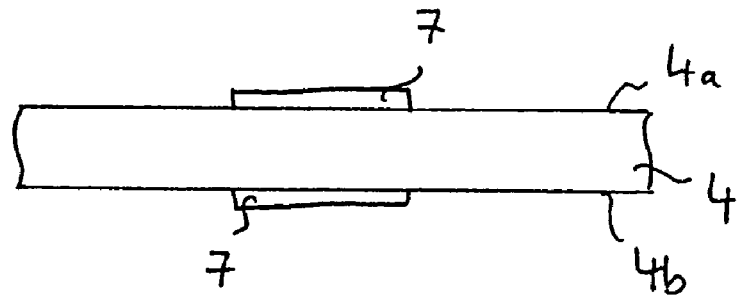
Fig. 3a
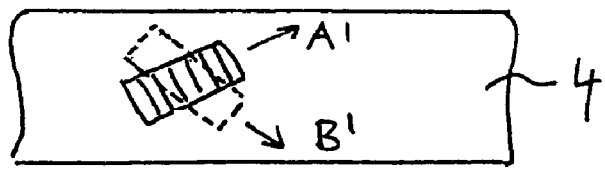
Fig. 3b

DEFORMABLE AERODYNAMIC PROFILE

BACKGROUND AND SUMMARY OF THE INVENTION

This application claims the priority of German patent document 103 04 530.9, filed Feb. 4, 2003 (PCT International Application No. PCT/DE2004/000162, filed Feb. 3, 2004) the disclosure of which is expressly incorporated by reference herein.

The present invention relates a deformable aerodynamic profile member.

Various arrangements and methods are known for adjusting and optimizing the buoyancy and flow resistance of a body with flow around it (e.g., in the form of an aerodynamic profile), to adapt to various ambient conditions. Such aerodynamic profiles may include, for example, helicopter rotor blades, aircraft wings or turbine blades, to name but a few examples.

In the field of aeronautical engineering, deformation of a profile curvature of such aerodynamic profiled members has been achieved mechanically by using different adjustment devices. However, gaps and hollow spaces then usually occur in the shell of the profile, which is a disadvantage for many applications.

To counteract this problem, German patent document DE 196 43 222 C2 discloses an arrangement in which the properties of flow around a body are modified by continuous deformation of an aerodynamic profile having an elastically deformable shell, using an adjustment device integrated into the profile.

German patent document DE 197 09 917 C1, on the other hand, describes a device for controlled deformation of a shell structure, having a number of bulging ribs, which are joined together by actuators to achieve a change in the curvature of an elastic component connected to the bulging ribs.

In addition, composite structures for producing and detecting deformation are known which have a plurality of piezoelectric fibers running in parallel (for example, U.S. Pat. Nos. 5,869,189 and 6,048,622). However, such fibers are very expensive, and are relatively inefficient due to their great weight. Furthermore, suitable contacting of the piezoelectric fibers is necessary. Another factor to be taken into account is achieving the most homogeneous possible field distribution, which is necessary for producing the piezoelectric effect. The electrodes required for this purpose may be provided, for example, by separate layers (i.e., electrode layers), which can be integrated into the composite structure only with a corresponding extra technical expense.

When using this known composite structure to induce deformation, it is also a disadvantage that as a rule a high voltage is necessary to trigger the piezoelectric fibers. This means that a high energy demand is generated, which makes the arrangement inefficient, and that a complex electronic control system is necessary. In addition, suitable safety provisions must be taken.

It is thus an object of the present invention to create a deformable aerodynamic profile whose profile curvature can be varied in a technically simple and effective manner.

This and other objects and advantages are achieved by the aerodynamic profiled member according to the invention, which has a front profile area, and a rear profile area situated in the downflow. The profiled member is bounded by shells on a pressure side and on a suction side, which converge at a rear edge of the profile. According to the invention, the profiled member is equipped with d33 piezo actuators in at least some locations for its deformation, such that their change in length occurs essentially in the direction of the planes of the shells when acted upon by electricity.

Because the so-called longitudinal (d33) effect (in which the change in length of the piezoelectric material takes place in the direction of the electric field) is known to be greater than the usual (d31) piezo effect (in which the change in length is perpendicular to the electric field), a more effective introduction of forces into the aerodynamic profile is possible by an appropriate alignment of piezoelectric actuators.

It is especially expedient to arrange the d33 piezo actuators on the pressure side and/or suction side of the shell. The shells are usually made of conventional construction materials and the d33 piezo actuators are attached, for example, by adhesive bonding. However, mechanical fastening means such as clamping devices or screwing devices may also be used for this purpose. In addition, the shell provided with the piezo actuators may also be provided with a protective layer to protect the piezo actuators from impact, pressure, pulling or other external influences (including environmental factors).

According to another embodiment, the d33 piezo actuators are integrated into the shell on the pressure side and/or suction side. This configuration is preferred in so-called composite structures, which may be metallic, but may also be so-called MMCs (metal matrix composites). Likewise, the d33 piezo actuators may be integrated into composite fiber structures. One advantage of this arrangement is that the piezo actuators are automatically protected.

Similarly, the invention may also be applied to other floating bodies, which are attached with an articulated joint to the aerodynamic profile, such as control flaps. In this case the control flap is provided with d33 piezo actuators which are aligned so that their change in length takes place essentially in the plane of the flap when exposed to an electric current in a similar manner. A design in which the flap with d33 piezo actuators is connected to the rear profile edge of the aerodynamic profile with an articulated connection is particularly advantageous.

It is especially advantageous for the d33 piezo actuators to be used in the form of stacks of piezoelectric elements (so-called piezo stacks or "laminar" piezo actuators) which have a laminar structure with alternating electrode layers and layers of piezoelectric material. This arrangement has the advantage that the electrodes are integrated into the piezo actuator, which greatly facilitates contacting of the piezo actuator and at the same time ensures a homogeneous field distribution within the piezo actuator. It is especially expedient that the electric field for inducing the d33 effect is supplied via the electrodes integrated into the laminar piezo actuator. The invention can therefore be implemented especially effectively and in a technically simple manner.

Furthermore, it is expedient for the laminar d33 piezo actuators to have a low thickness (approx. 0.5 to 2.5 mm) so that they have hardly any influence at all on the flow conditions. It is advantageous that such thin-layered d33 piezo actuators can be introduced or integrated easily into the shells of aerodynamic profiles, and have a low weight.

Furthermore it is expedient that the side dimensions of the d33 piezo actuators are between 5 and 60 mm. This permits easy adaptation to given geometries (e.g., corners, edges, rounded shapes, etc.).

The invention can be used, for example, in helicopter rotor blades, aircraft wings, turbine blades or the like.

Other objects, advantages and novel features of the present invention will become apparent from the following detailed description of the invention when considered in conjunction with the accompanying drawings.

BRIEF DESCRIPTION OF THE DRAWINGS

FIG. 2a) is a schematic diagram of a stacked piezoelectric element which shows the d33 effect, while FIG. 2b) shows the d31 effect;

FIGS. 3a) and b) are schematic views which illustrate a torsional convexity partial cross-sectional and top views of a shell, respectively;

DETAILED DESCRIPTION OF THE DRAWINGS

Figure 1:
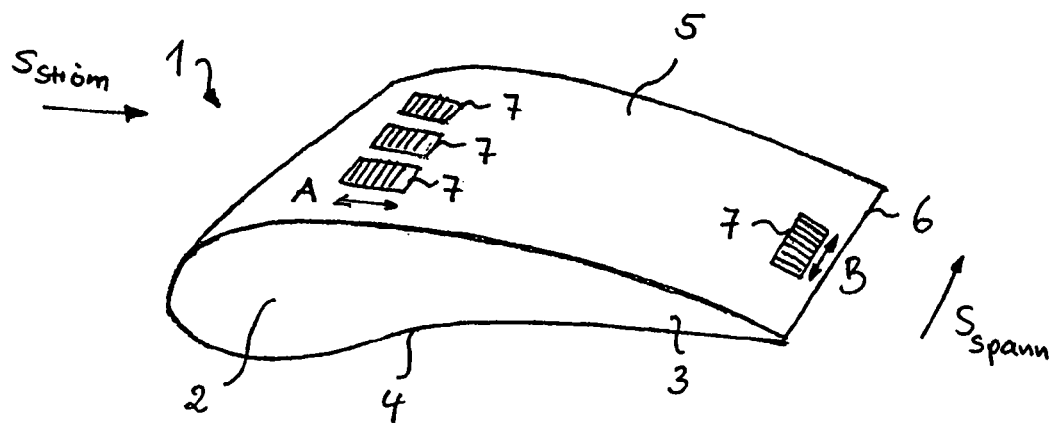
FIG. 1 is a schematic three-dimensional view of an aerodynamic profile with d33 piezo actuators.

FIG. 1 is a schematic depiction of an aerodynamic profiled member, 1 which has a front profile area 2 and a rear profile area 3 situated on the downflow side (in the direction of flow illustrated by the arrow $S_{flow}$). The profile 1 is bordered in a known way by a shell 4 on the pressure side and a shell 5 on the suction side, which converge in a rear profile edge 6 in the rear profile area 3. The rear profile edge 6 runs in the width direction $S_{width}$. Such an aerodynamic profile 1 may be, for example, a helicopter rotor blade or an aircraft wing, both of which are well known in the state of the art, so that no further description of individual details is needed here.

The aerodynamic profile 1 is also provided with piezo actuators 7, which are arranged on the shell 5 (on the suction side in the embodiment according to FIG. 1). The actuators may of course also be provided either additionally or exclusively on the shell 4 on the pressure side, depending on the demands of the application. The piezo actuators 7 are attached to the shell(s) by gluing or by other fastening means (e.g., clamping devices, screwing devices, etc.).

These piezo actuators 7 have the so-called d33 effect (longitudinal effect), which is explained in greater detail in conjunction with FIG. 2. FIGS. 2a and 2b are schematic diagrams which show a stacked piezoelectric element 8 (also known as piezo stack) which is constructed of alternating layers of electrically conducting material and piezoelectric material, as is already known. The layers of electrically conducting material are electrodes 8a. In FIG. 2a, the electric field E runs in the stack direction and/or the longitudinal direction of the piezoelectric element 8, with the electric field E expediently being provided by the electrodes 8a. The electric field E causes the piezoelectric material to expand in the direction of the electric field E. This change in length is labeled as $\Delta L$ in FIG. 2a. It is known to be greater than the change in length $\Delta l$ in the d31 effect, in which the change in length $\Delta l$ occurs across the electric field E (see FIG. 2b).

The piezo stack 8 shown in FIG. 2a is cut in the longitudinal direction (shown by the broken lines) for use as d33 piezo actuators 7 for the aerodynamic profiled member in FIG. 1. The laminar structure with alternating layers of piezoelectric material and electrically conducting material is retained. The thickness d of the piezo actuators 7 cut in this way typically amounts to 0.5 to 2.5 mm and the side dimensions a and b are typically between 5 and 60 mm.

The arrangement of the cut laminar d33 piezo actuators 7 on the aerodynamic profile 1 is based on the application, so the profile curvature can be varied in the desired direction. Thus, FIG. 1 shows as an example three d33 piezo actuators 7 arranged in the front profile area 2, aligned so that their change in length $\Delta L$ when acted upon by electricity within the shell 5 takes place in the direction of flow $S_{flow}$, as indicated with the double arrow A. In addition, the d33 piezo actuators 7 may also be arranged in such a way that their change in length takes place in the width direction in the plane of the shell 5 (represented by the actuator 7, arranged near the rear edge 6). The direction of the change in length of this actuator is labeled with the double arrow B here.

The piezo actuators 7 may of course also be arranged in such a way that the change in length within and/or parallel to the planes of the shell is oriented in a direction between the directions A and B (not shown in FIG. 1). Minor deviations, due to for example incomplete fastening of the piezo actuators flatly on the shells (i.e., they are at a slight inclination with respect to the planes of the shells) are harmless, and are within the range of tolerance. It is essential here that the d33 piezo actuators be arranged in such a way that their change in length, when acted upon by electricity, runs essentially in the direction of the planes of the shells 4 and/or 5. Corresponding changes in length in the plane of the shells 4, 5 (and thus curvature) can be achieved in this way.

When torsion of the aerodynamic profile 1 is desired, the d33 piezo actuators 7 are arranged in a similar manner on both sides of the respective shell 4 and/or 5, as explained with reference to FIGS. 3a and 3b. FIG. 3a shows as an example a partial cross-sectional view of the shell 4 on the pressure side with d33 piezo actuators 7 attached to its top and bottom sides 4a, 4b. As described previously, the d33 piezo actuators 7 are arranged in such a way that their length changes essentially in the direction of the plane of the shell when acted upon by electricity; they undergo a change in length essentially in the direction of the plane of the shell. The piezo actuators 7 on the top and bottom sides 4a, 4b, however, have a different orientation with respect to one another, as depicted in FIG. 3b (a top view of the detail shown in FIG. 3a). The d33 piezo actuators 7 arranged on the top side 4a points in a direction A' within the plane of the shell 4, and the piezo actuators 7 (shown with dotted lines) arranged on the bottom side 4b points in a direction B'. Due to this "crossed" arrangement, torsion is induced in the respective shell on actuation of the piezo actuators 7.

According to another embodiment (not shown), the thin d33 piezo actuators 7 can be integrated into the shells 4, 5 on the pressure side and/or on the suction side. Such a design is beneficial, for example, when the shells are made of composite materials. Due to the integration of the piezo actuators into the composite structure, the actuators 7 are protected, while on the other hand the most symmetrical possible curvature is achieved. The latter is advantageous in particular when the shells have a relatively great thickness in relation to the actuator thickness d. Such an integrated arrangement is typically used with composite structures (e.g., metallic composite structures, MMCs, fiber composite materials, etc.).

Figure 4:
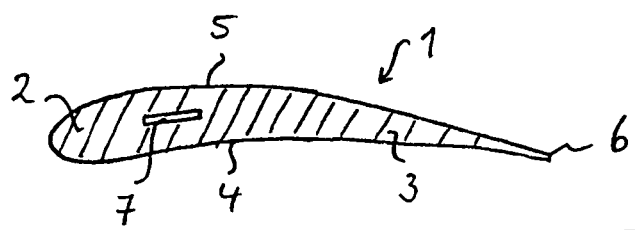
FIG. 4 is a sectional view of another embodiment of an aerodynamic profiled member according to the invention.

In a special embodiment of this design, which is depicted schematically in FIG. 4, the shells are not designed separately of a composite material; rather the entire profile is designed as a composite material. In this case the aerodynamic profile 1 is not hollow. Instead, it has a compact design and the piezo actuators 7 are arranged inside. (A piezo actuator 7 is depicted only schematically in FIG. 4.)

Figure 5:
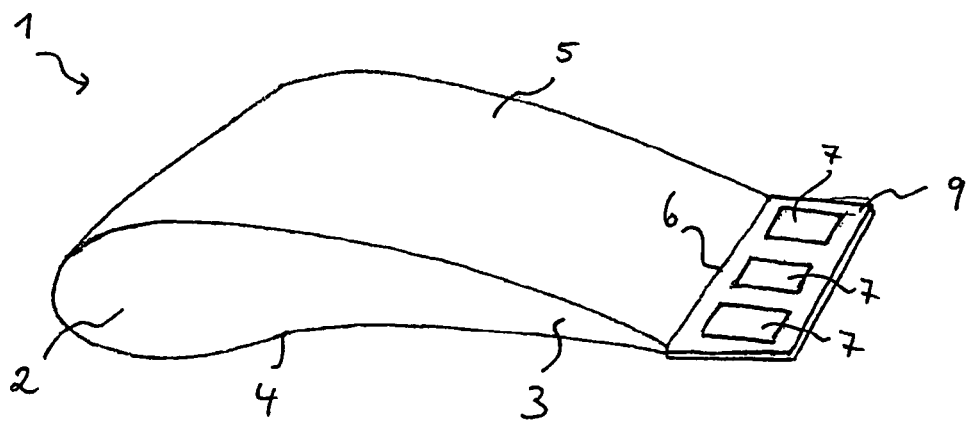
FIG. 5 is a schematic three-dimensional view of an aerodynamic profile with the control flap connected by an articulated joint.

The active principle of this invention can also be applied similarly to other profiled elements that are exposed to oncoming flow, and are mounted on the aerodynamic profile 1, for example. This is indicated schematically in FIG. 5, which shows an aerodynamic profile 1 that has another oncoming flow profile pivotably hinge-connected to its rear profile edge 6. For deflection and/or curvature of the flap 9, the d33 piezo actuators 7 are mounted on the flap 9, so that the change in length of the d33 piezo actuators when they are acted upon by electricity takes place in the direction of the plane of the flap 9, as is the case with the arrangement described in conjunction with FIG. 1.

In each of the embodiments described above, the piezo actuators 7 may be sheathed with electrically insulating material (e.g., ceramic, polymer, etc.) completely or only at the interface with the structure (e.g., shell 4, 5 on the pressure side or on the suction side) or coated to ensure insulation of the structure. This is relevant in particular when the structure to which the piezo actuator is applied is electrically conducting. Similarly, such a sheathing may also be used for protective purposes.

The stacked d33 piezo actuators used here may be supplied with electricity via the electrodes 8a in a simple manner, as described above. The operating voltage is typically in the range of 50-500 V and contacting of the electrodes 8a can be accomplished through soldered connections or bus connections that are technically easy to implement.

The inventive principle explained above is described as used in the curvature of helicopter rotor blades, aircraft wings, turbine blades or similar applications. However, use of the inventive idea is not limited to these specific examples.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A deformable aerodynamic profiled member comprising:
   a front profile area;
   a rear profile area;
   shells which bound the profiled member on a pressure side and on a suction side, which shells converge in a rear profile edge; and
   deforming means for varying a curvature of said profiled member by changing length of at least one of said shells in a desired direction; wherein,
   said deforming means comprises at least one d33 piezo actuator mounted on said at least one shell; and
   said at least one piezo actuator is arranged on said at least one shell with an orientation such that a change of length of said at least one piezo actuator cause a change of length in a plane of said at least one shell in said desired direction, and a corresponding deformation of said profile, when said at least one actuator is acted upon by electricity.

2. The deformable aerodynamic profiled member according to claim 1, wherein the d33 piezo actuators are arranged on at least one of the pressure side and the suction side.

3. The deformable aerodynamic profiled member according to claim 1, wherein the d33 piezo actuators are integrated into at least one of the shells, on at least one of the pressure side and the suction side.

4. The deformable aerodynamic profiled member according to claim 3, wherein the at least one shell has a composite structure.

5. The deformable aerodynamic profiled member according to claim 1, wherein the aerodynamic profile is one of a helicopter rotor blade, an aircraft wing, a turbine blade or the like.

6. The deformable aerodynamic profiled member according to claim 1, wherein:
   the piezo actuator comprises alternating lamina of d33 piezoelectric material and electrically conducting material, arranged in a stacking direction; and
   the piezo actuators are oriented relative to said profiled member with the stacking direction coinciding substantially with a desired expansion direction of said profiled member.

7. The deformable profiled member according to claim 1, wherein said piezo actuators comprise stack-form piezoelectric elements cut lengthwise, in a plane parallel to said expansion.

8. The deformable aerodynamic profiled member according to claim 1, wherein each of the d33 piezo actuators comprises a stack of alternating layers of piezoelectric materials and electrode layers formed of an electrically conducting material.

9. The deformable aerodynamic profiled member according to claim 8, wherein an electric field for inducing the d33 effect is supplied via the electrode layers.

10. The deformable aerodynamic profiled member according to claim 8, wherein the laminar d33 piezo actuators have a thickness of approximately 0.5 to 2.5 mm.

11. The deformable aerodynamic profiled member according to claim 10, wherein the laminar d33 piezo actuators have side edge dimensions of approximately 5 to 60 mm.

* * * * *